(12) United States Patent
Dempster (10) Patent No.: US 11,247,900 B2
(45) Date of Patent: Feb. 15, 2022

(54) ELECTRICAL DISCHARGE CELL FOR GENERATING OZONE

(71) Applicant: Pacific Ozone Technology, Inc., Benicia, CA (US)

(72) Inventor: Philip Tinsley Dempster, Concord, CA (US)

(73) Assignee: Evoqua Water Technologies LLC, Pittsburgh, PA (US)

(*) Notice: Subject to any disclaimer, the term of this patent is extended or adjusted under 35 U.S.C. 154(b) by 81 days.

(21) Appl. No.: 16/659,512

(22) Filed: Oct. 21, 2019

(65) Prior Publication Data

US 2021/0114872 A1    Apr. 22, 2021

(51) Int. Cl.
*C01B 13/11*    (2006.01)

(52) U.S. Cl.
CPC ........ *C01B 13/115* (2013.01); *C01B 2201/12* (2013.01); *C01B 2201/24* (2013.01); *C01B 2201/32* (2013.01)

(58) Field of Classification Search
CPC ............... C01B 13/115; C01B 2201/12; C01B 2201/24; C01B 2201/32; C01B 2201/22; C01B 2201/34; C01B 2201/64; C01B 2201/74; C01B 13/11; C01B 2201/76; B01J 19/08; B01J 19/088; Y10T 29/49124; Y10S 422/907; H01T 23/00
See application file for complete search history.

(56) References Cited

U.S. PATENT DOCUMENTS

| 5,512,254 A | 4/1996 | Landgraf | |
|---|---|---|---|
| 2006/0024220 A1* | 2/2006 | Orishima | C01B 13/11 422/186.07 |
| 2006/0045826 A1* | 3/2006 | Mullaney | C01B 13/11 422/186.22 |

* cited by examiner

*Primary Examiner* — Xiuyu Tai (57) ABSTRACT

An electrical discharge ozone generation cell has first and second electrode base plates which are separated by a nonconductive flat spacer plate. Within a central opening in the spacer plate is fitted an electrode plate in close contact with the first electrode base plate. A dielectric plate in close contact with the second electrode base plate and with the spacer plate helps define a gas discharge chamber with the interior edges of the spacer plate and the electrode plate. Gaskets on the two sides of the spacer plate around the central opening displaced away from the interior edges of the spacer plate ensure a gas seal for the electrical discharge chamber.

42 Claims, 7 Drawing Sheets

ELECTRICAL DISCHARGE CELL FOR GENERATING OZONE

BACKGROUND OF THE INVENTION

This invention relates to electrical discharge cells and, more particularly, to electrical discharge cells for generation of ozone.

There are many applications for ozone, including waste and water treatment, disinfection, cleaning, odor removal, pest extermination, and sterilization. Hence many ozone generation systems are very large, such as those for municipal waste and water treatment plants, while other ozone generation systems are smaller, such as systems for small industrial and domestic applications.

In a typical ozone generation system a feed gas source supplies the feed gas to an ozone generation cell through a flow controller. Besides oxygen, the feed gas may be ambient air or oxygen-concentrated air. A power supply provides the energy for the cell to generate ozone for an application process.

The ozone generation cell may operate in many ways, including the ionization of oxygen using electrical discharge (also called corona discharge) to create ozone. The present invention uses such electrical discharge in its ozone generation cell. But there are many problems with ozone and its generation. Ozone is highly corrosive which leads to problems in the selection of materials and the costs of those materials which are resistant to ozone. The corroded elements in the generation cell are required to be replaced occasionally. Hence any ozone generation cell should be easily repairable, and/or the corroded elements easily replaceable. The generation cell should also be designed for the optimum production of ozone at relatively low cost.

The present invention relates to an electrical discharge ozone generation cell which addresses these issues. The ozone generation cell has relatively low-cost parts with easy assembly and disassembly for simple replacement of parts and repair of the cell. The electric discharge chamber of the cell is designed for a high output of ozone.

BRIEF SUMMARY OF THE INVENTION

The present invention provides for an electrical discharge ozone generation cell which has a nonconductive spacer plate separating first and second electrode base plates, the spacer plate having two sides and interior edges defining a central opening in the spacer plate; an electrode plate in contact with the first electrode base plate, the electrode plate fitted within the central opening of the spacer plate; a dielectric plate in contact with the second electrode base plate and with the spacer plate, a gas discharge chamber defined by the dielectric plate, the interior edges of the spacer plate and the electrode plate; and gaskets on the two sides of the spacer plate around the central opening displaced away from the interior edges of the spacer plate whereby the gaskets ensure a gas seal for the discharge chamber at a reduced exposure to plasma and ozone in the discharge chamber.

The present invention also provides for an electrical discharge ozone generation cell which has a nonconductive spacer plate separating first and second electrode base plates, the spacer plate having two sides and interior edges defining a central opening in the spacer plate; an electrode plate in intimate contact with the first electrode base plate, the electrode plate fitted within the central opening of the spacer plate; a dielectric plate in intimate contact with the second electrode base plate and with the spacer plate, a gas discharge chamber defined by the dielectric plate, the interior edges of the spacer plate and the electrode plate; and gaskets on the two sides of the spacer plate around the central opening to ensure a gas seal for the discharge chamber; wherein the spacer plate having a first predetermined thickness, the electrode plate having a second predetermined thickness, the dielectric plate has a third predetermined thickness, and a difference between the first predetermined thickness and a sum of the second and third predetermined thicknesses creates the discharge chamber with the interior edges of the spacer plate.

The present invention also provides for an electrical discharge ozone generation cell which has a nonconductive spacer plate separating first and second electrode base plates, the spacer plate having two sides and interior edges defining a central opening in the spacer plate; an electrode plate in intimate contact with the first electrode base plate, the electrode plate fitted within the central opening of the spacer plate, wherein the electrode plate comprises anodized aluminum; a dielectric plate in intimate contact with the second electrode base plate and with the spacer plate, a gas discharge chamber defined by the dielectric plate, the interior edges of the spacer plate and the electrode plate; and gaskets on the two sides of the spacer plate around the central opening displaced away from the interior edges of the spacer plate whereby the gaskets ensure a gas seal for the discharge chamber at a reduced exposure to ozone in the discharge chamber. The anodized aluminum electrode plate is preferably infused with PTFE.

The present invention also provides for an electrical discharge ozone generation cell which has a nonconductive flat spacer plate separating first and second electrode base plates, the spacer plate having two sides and interior edges defining a central opening in the spacer plate; a flat electrode plate in intimate contact with the first electrode base plate, the electrode plate fitted within the central opening of the spacer plate; a flat dielectric plate in intimate contact with the second electrode base plate and with the spacer plate, a gas discharge chamber defined by the dielectric plate, the interior edges of the spacer plate and the electrode plate; gaskets on the two sides of the spacer plate around the central opening displaced away from the interior edges of the spacer plate whereby the gaskets ensure a gas seal for the discharge chamber at a reduced exposure to ozone in the discharge chamber; and a clamping arrangement engaging peripheries of the first and second electrode base plates through the spacer plate; whereby the flat spacer plate, flat electrode plate, flat dielectric plate and gaskets are bound together between the first and second electrode base plates with minimal distortion.

The present invention further provides for an electrical discharge ozone generation cell which has a nonconductive spacer plate separating first and second electrode base plates, the spacer plate having two sides and interior edges defining a central opening in the spacer plate; an electrode plate in intimate contact with a surface of the first electrode base plate, the electrode plate fitted within the central opening of the spacer plate; a dielectric plate in intimate contact with the second electrode base plate and with the spacer plate, a gas discharge chamber defined by the dielectric plate, the interior edges of the spacer plate and the electrode plate, the gas discharge chamber having two opposing ends at which a displacement of the interior edges of the central opening from the electrode plate at the two opposing ends; and channels along the surface of the first electrode base plate at each of the two opposing ends of the gas discharge chamber, the channels connected through the first electrode base plate to gas input and output terminals, the channels exposed to the gas discharge chamber by a displacement of the interior edges of the central opening from the electrode plate at the two opposing ends; whereby the channels form manifolds for the input and output of gas to and from the gas discharge chamber.

Other objects, features, and advantages of the present invention will become apparent upon consideration of the following detailed description and the accompanying drawings, in which like reference designations represent like features throughout the figures.

It should be understood that the drawings are representational for the edification of the reader and that are not necessarily drawn to scale.

DETAILED DESCRIPTION OF THE INVENTION

Figure 1:
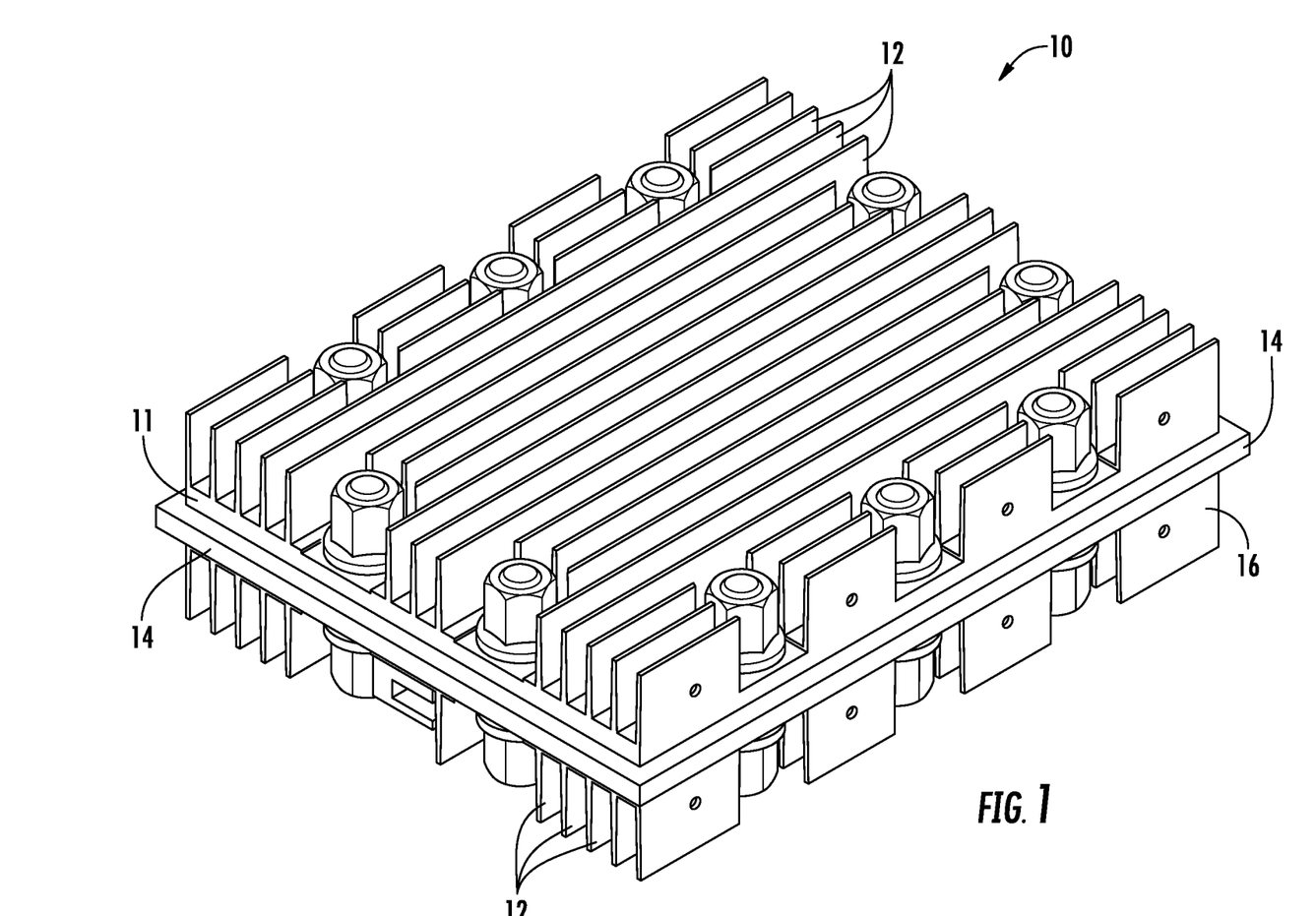
FIG. 1 is a perspective view of an assembled ozone generation corona discharge cell according to one embodiment of the present invention.

A perspective view of the assembled electrical discharge ozone generation cell 10 is illustrated in FIG. 1. The cell 10 has a top heat sink and electrode base plate 11, and a bottom heat sink and electrode base plate 16 on either side of a flat, nonconductive spacer plate 14. The spacer plate 14 is formed from preferably polycarbonate or other suitable plastic. Each base plate 11 and 16 has a unitary structure with a flat surface facing the spacer plate 14 and cooling fins 12 on the opposite side of the flat surface. During operation air is blown over the cell 10 and the cooling fins 12 lower the temperature of the cell 10. The electrode base plates 11 and 16 are connected to the power supply which provides a high alternating voltage potential between the plates 11, 16. The thickness of the insulating spacer plate 14 prevents conduction between the plates 11, 16. It should be noted that the words, "top" and "bottom," with reference to the drawings are used for the benefit of the reader. Operationally, the ozone generation corona discharge cell 10 can operate irrespective of orientation.

Figure 2A:
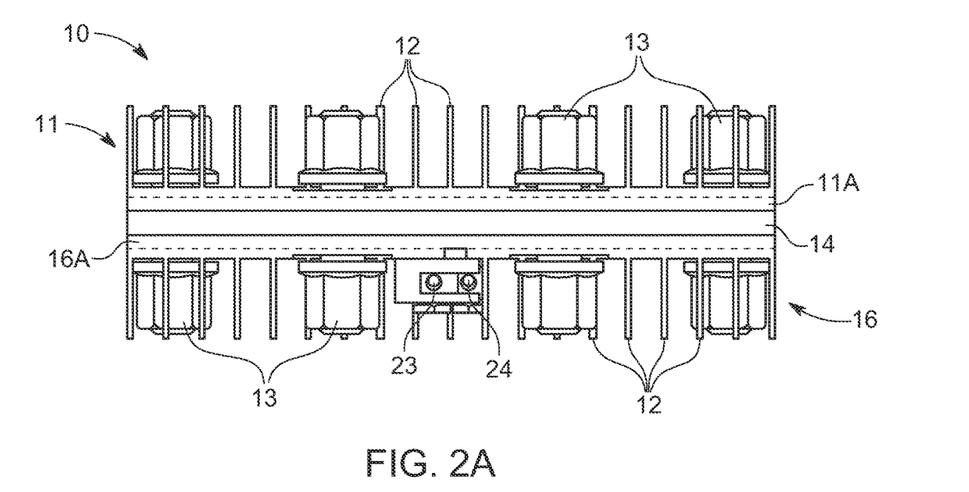
FIG. 2A is a side view of the assembled ozone generation corona discharge cell of FIG. 1 in a direction parallel to the cooling fins.
Figure 2B:
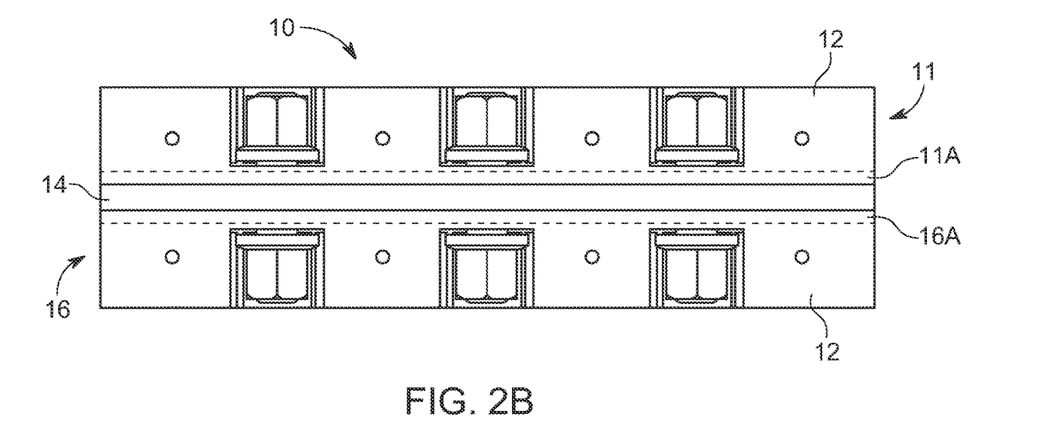
FIG. 2B is a side view of the assembled ozone generation corona discharge cell of FIG. 1 in a direction perpendicular to the cooling fins.

FIGS. 2A and 2B are side views of the assembled ozone generation corona discharge cell 10. FIG. 2A is a view parallel to the direction of the cooling fins 12 and FIG. 2B a view perpendicular to the direction of the cooling fins 12. These side views show the respective flat surfaces of the electrode base plates 11 and 16 which sandwich the spacer plate 14 between them. Nonconductive fasteners 13 bind the plates 11 and 16 together with the spacer plate 14. On the bottom heat sink and electrode base plate 16 are a gas inlet/outlet 23 and gas inlet/outlet 24, which are described in greater detail below.

Figure 3:
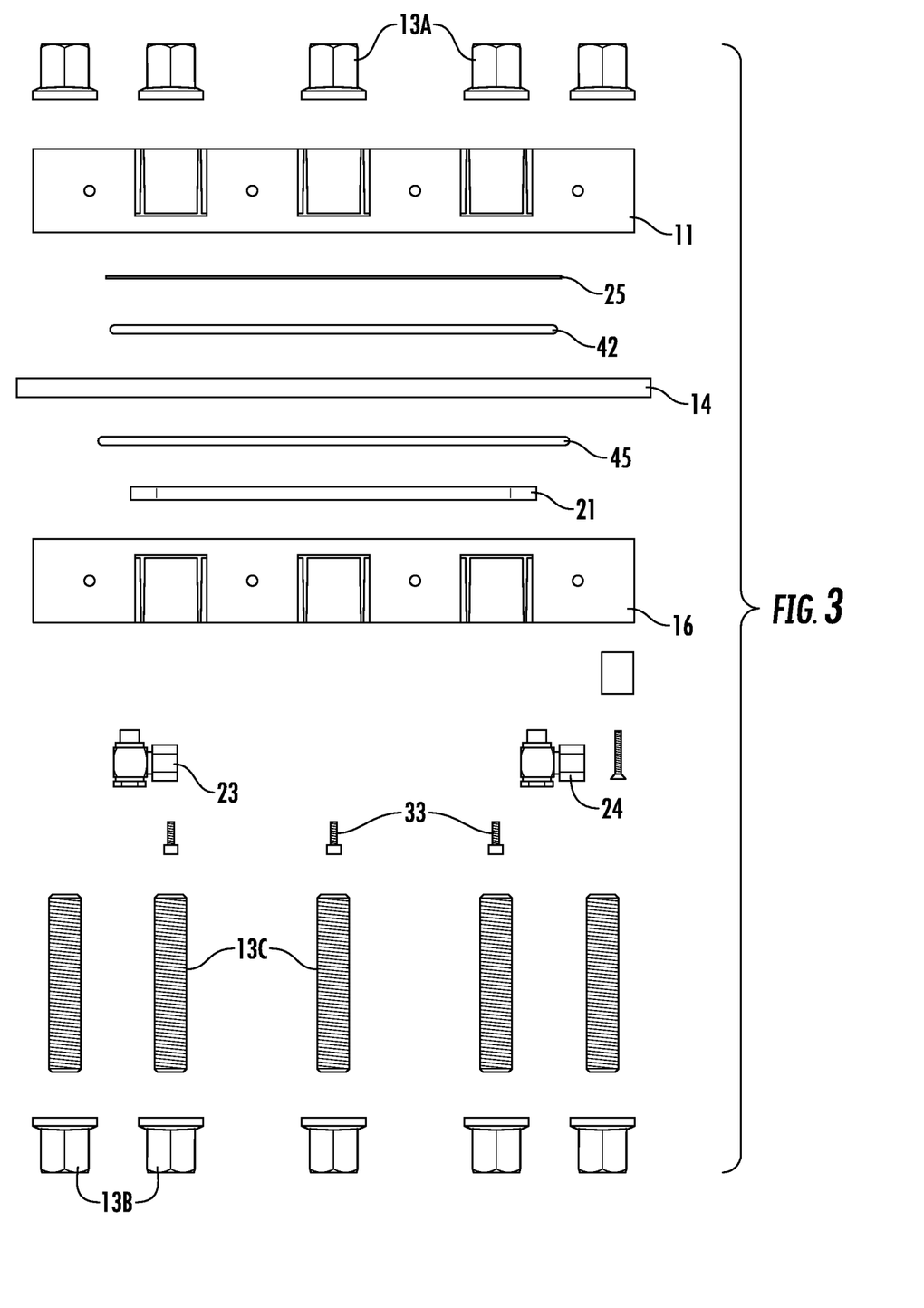
FIG. 3 is an exploded side of the ozone generation corona discharge cell of FIG. 1 in a direction perpendicular to the cooling fins.

FIG. 3 is an exploded side view of the electric discharge ozone generation cell 10 which shows many of the main elements of the cell, besides the top heat sink and electrode base plate 11, the bottom heat sink and electrode base plate 16, and the spacer plate 14. An elastic O-ring gasket 42 and a dielectric plate 25 lie between the top base plate 11 and the spacer plate 14. An elastic O-ring gasket 45 and an electrode plate 21 lie between the bottom base plate 16 and the spacer plate 14. The spacer plate 14 has a central opening (not shown in the drawing) and the O-ring gaskets 42 and 45 encircle the opening periphery on either side of the spacer plate 14 to help form gas-tight seals. The central opening in the spacer plate 14, the dielectric plate 25 and the electrode plate 21 mainly define the discharge chamber in which ozone is generated.

Figure 4:
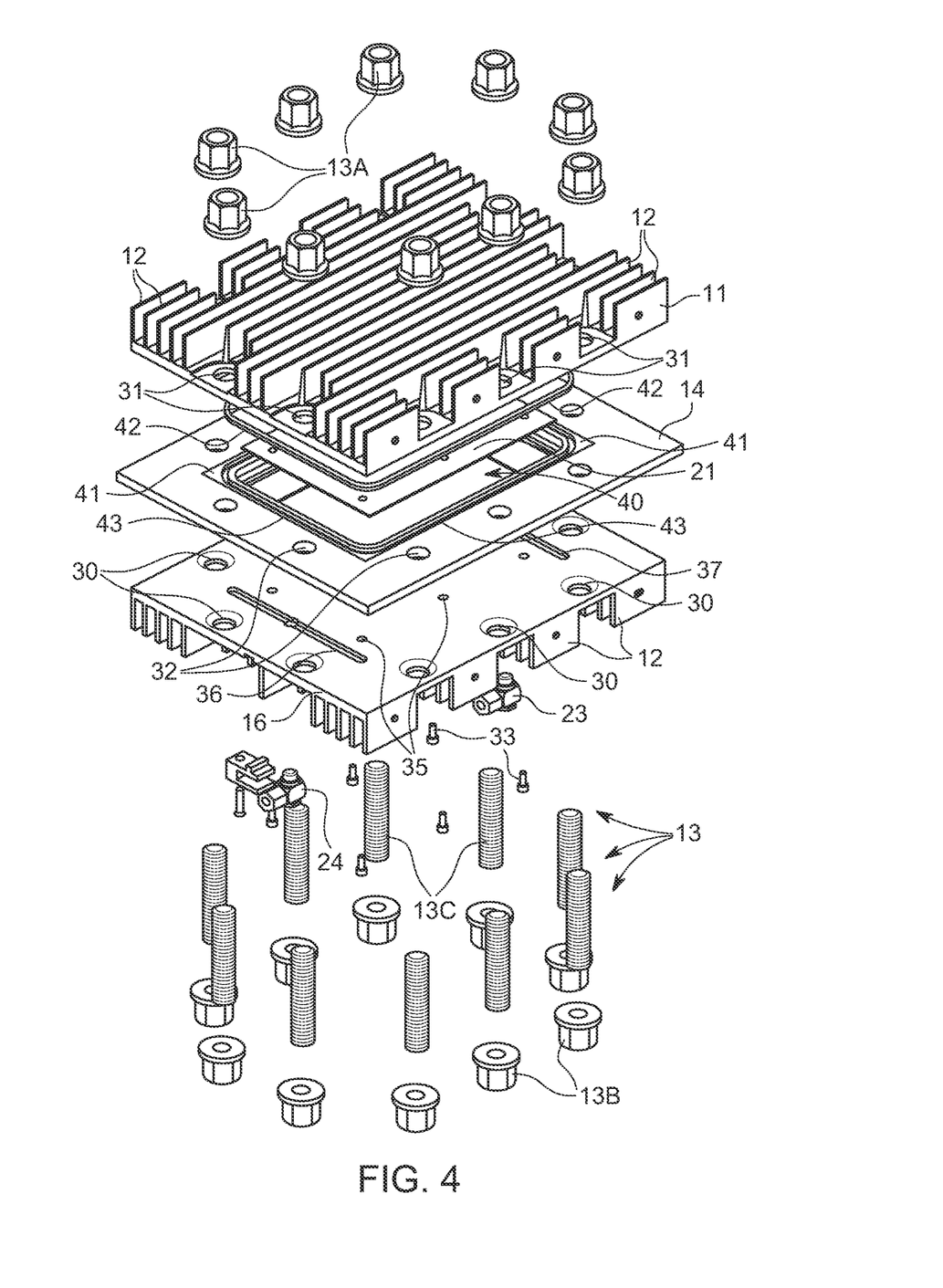
FIG. 4 is an exploded perspective view of the ozone generation corona discharge cell of FIG. 1.

FIG. 4 is a perspective exploded view of the cell 10 with the electrode base plates 11 and 16 displaced away from the spacer plate 14. The nonconductive fasteners 13 are detailed as threaded rods 13C formed from plastic reinforced with fiberglass. The rods 13C engage socket head screws 13A and 13B at either rod end. The nonconductive screws 13A and 13B are likewise formed from plastic reinforced with fiberglass. Other possible arrangements include a nut and bolt for a fastener 13. The fasteners 13, or more precisely, the rods 13C, pass through holes 32 located around the periphery of the spacer plate 14 and through holes 31 and 30 around the periphery of the top and bottom heat sink and electrode base plates 11, 16 respectively.

Figure 5A:
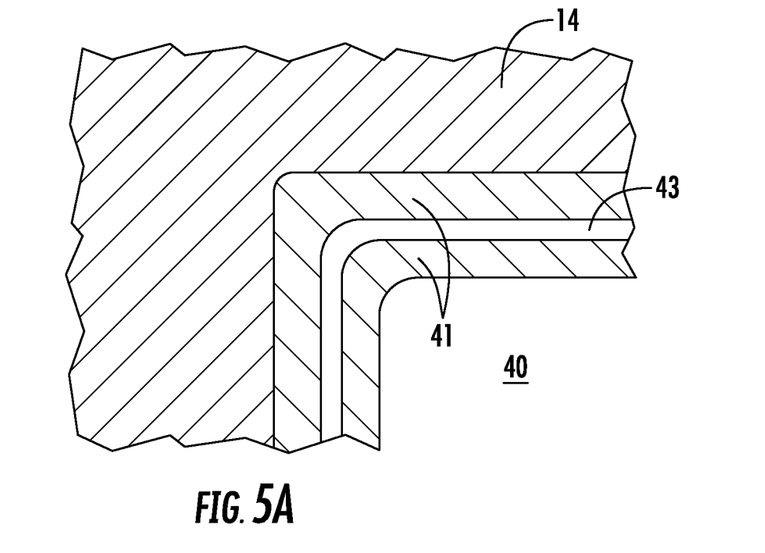
FIG. 5A is a top detailed view of one corner of the spacer plate element of the ozone generation cell of FIG. 1.
Figure 5B:
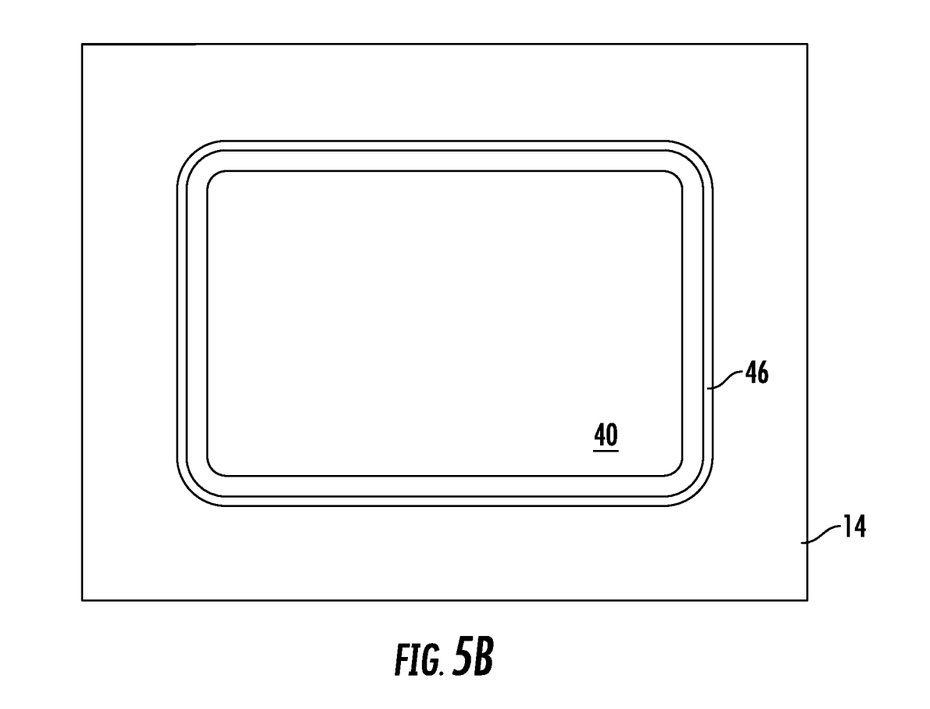
FIG. 5B is a bottom view of the spacer plate of FIG. 5A.

Around the periphery of the central opening 40 in the spacer plate 14 is a recess 41 into which the dielectric plate 25 (see FIG. 3) fits against the top heat sink and electrode base plate 11. The O-ring gasket 42 fits into a groove 43 which encircles the central opening 40 of which only a corner is illustrated by the detailed drawing of FIG. 5A. FIG. 5B shows fits a groove 46 for the O-ring gasket 45 which encircles the central opening 40. The O-ring gasket 45 and the groove 46 lie on the side of the spacer plate 14 facing the bottom heat sink and electrode base plate 16. Both gaskets 42 and 45 are glued in their corresponding grooves 43 and 46 prior to final assembly of the cell 10. The gaskets 42 and 45 are formed from suitable elastic material, preferably FKM, a family of fluoroelastomers, such as Viton® O-rings. Viton® is a registered trademark of The Chemours Company of Wilmington, Del.

The flat electrode plate 21 fits within the central opening 40 of the spacer plate 14 when the cell 10 is assembled. The plate 21 is preferably anodized aluminum which is infused with PTFE(Polytetrafluoroethylene, or commonly, Teflon®, a registered trademark of The Chemours Company of Wilmington, Del.) to resist ozone corrosion. The plate 21 may also be simply anodized aluminum or also be constructed of high chrome steel, e.g., stainless steel, titanium or various sandwiches of conductive material, including alumina bonded to a conductive carrier. The plate 21 is mounted for close contact with the flat surface of the bottom heat sink and electrode base plate 16 by multiple screws 33. The screws 33 are blind tapped into the plate 21 through holes 35 in the bottom base plate 16. Alternatively, the screws 33 may also be tapped through the plate 21. They may be flathead screws that tap into the bottom electrode base plate 16, either blind tapped or tapped through. Or, the plate 21 may be simply bonded to the bottom electrode base plate 16. Preferably the screws 33 have O-ring seals or washer seals under their heads. In any case, the plate 21 is attached to the bottom electrode base plate 16 in a way that does not allow leakage of gas from the interior to the exterior of the cell 10.

As shown in FIG. 4, there are channels 36 and 37 along the flat surface of the bottom heat sink and electrode base plate 16 to form manifolds for the feed gas to enter the discharge chamber (shown in FIG. 5B) of the cell 10 and for the ozone produced in the chamber and unconsumed gas to exit the discharge chamber. The gas manifold channels 36 and 37 are respectively connected to the gas inlet/outlet 24 and gas inlet/outlet 23 through the electrode base plate 16 through holes 38 and 39 at the bottom of their respective manifold channels 36, 37. While the gas inlet/outlets 24 and 23 appear next to each other in FIG. 2A, they are displaced from each other as is evident in FIG. 4.

The flat dielectric plate 25 is formed from alumina ceramic. As is well-known, the dielectric plate serves to distribute electrical discharge in the narrow gap of a discharge chamber. Without the distribution of discharge, an electric arc is established in a specific location producing little ozone and damaging the generation cell.

Figure 6A:
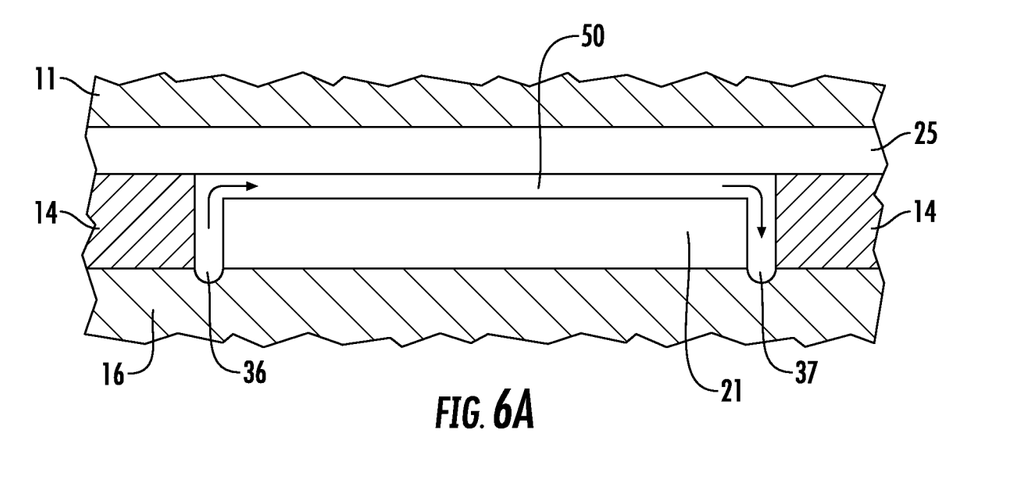
FIG. 6A is a detailed cross-sectional side view of the discharge chamber of the ozone generation cell of FIG. 1.
Figure 6B:
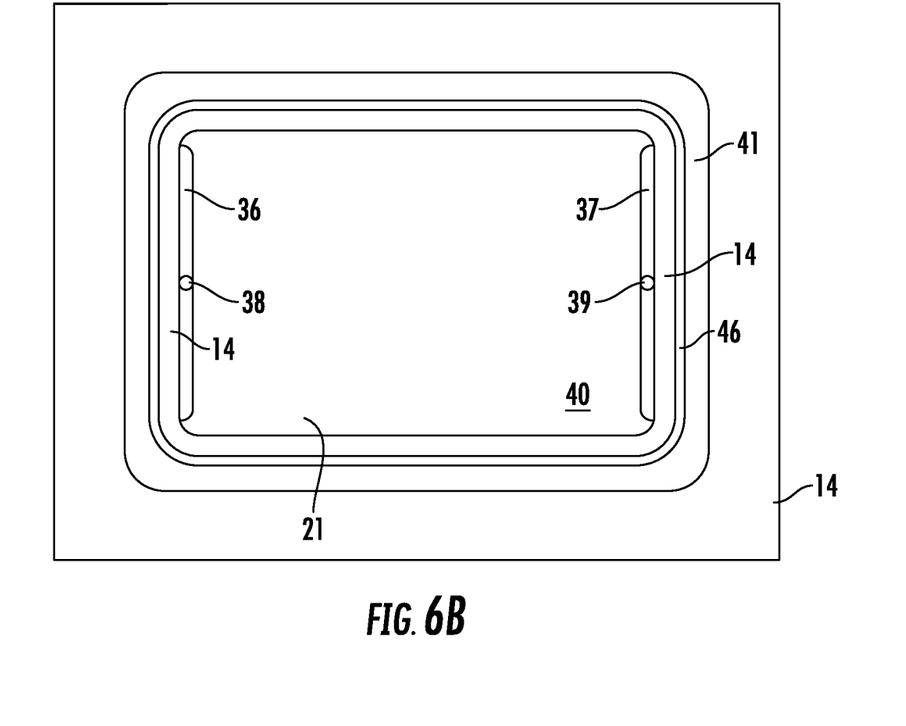
FIG. 6B is a detailed cross-sectional top view of the discharge chamber of FIG. 6A.

As described above, the dielectric plate 25 fits into the recess 41 when the cell 10 is assembled. From the difference in the thickness of the spacer plate 14 and the sum of the thicknesses of the electrode plate 21 and the dielectric plate 25, a discharge chamber 50 is formed by the dielectric plate 25, electrode plate 21 and the edges of the central opening 40 of the spacer plate 14. A side view of the discharge chamber space 50 is illustrated by FIG. 6A. The gap between the dielectric plate 25 and electrode plate 21 is narrow, in the range of $(10$ to $30) \times 10^{-3}$ inch for optimum electrical discharge and ozone production. Feed gas is introduced into the discharge chamber 50 through one of the manifold channels 36, 37. An electric potential difference between the electrode plate 21 and the dielectric plate 21 provides the conditions for an electric discharge in the chamber 50. Feed gas is introduced into the discharge chamber 50 through one of the manifold channels 36, 37 and the resulting ozone and remaining feed gas is removed through the other of the manifolds 37, 36. The top view of FIG. 6B shows that the gas manifold channels 36 and 37 are parallel to, and located at either end of the electrode plate 21 in the assembled cell 10. The gas manifold channels 36 and 37 distribute the feed gas through the discharge chamber 50 for optimum production of ozone.

Figure 7A:
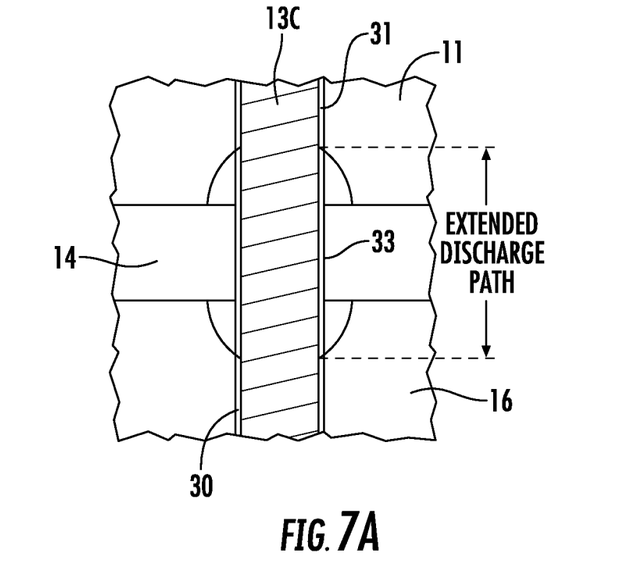
FIG. 7A represents a cross-sectional side view of the fasteners of an assembled FIG. 1 cell.
Figure 7B:
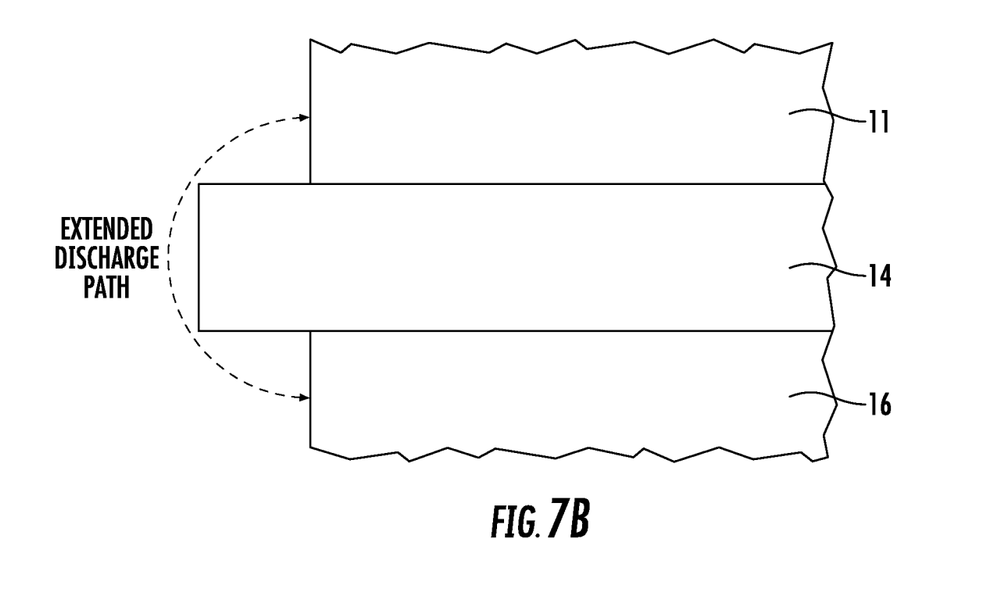
FIG. 7B represents a detailed cross-sectional side view of the ends of the base plate electrodes and spacer plate of an assembled FIG. 1 cell.

The electrical potential differences, i.e., voltages, in ozone production are high and care is taken to avoid undesirable electrical short circuits. The holes 31 and 30 at the flat surfaces of the top and bottom heat sink and electrode base plates 11, 16 respectively are chamfered, as illustrated in the detailed drawing of FIG. 7A. As described above, the holes 31 and 30 together with the holes 32 in the spacer plate 14 receive the fastener rods 13C for clamping the cell assembly. The chamfering of the holes 31 and 30 increase the distance between the electrode base plates 11 and 16 through the holes 32, 31 and 30; the increase in distance decreases the likelihood of an undesired discharge between the electrode plates 11 and 16. Additionally, the insulating spacer plate 14 is made larger laterally than the electrode base plates and 16. This allows for a thinner spacer plate 14. As illustrated in the side view of FIG. 7B, the extended spacer plate 14 increases the distance between the conducting top and bottom heat sink and electrode base plates 11, 16 further preventing short circuits around the edges of the assembly.

It should be noted that the main structural elements of the cell 10 are flat or adapted to flat surfaces. This allows the elements to be simple and easily manufacturable. For example, even the top and bottom base plate elements 11 and 16 are essentially a combination of a flat base 11A, 16A and cooling fins 13. It is preferable to build the heat sink and electrode base plates 11 and 16 as unitary pieces either by a machining or extrusion process, but these elements 11 and 16 can be constructed as a separate heat sink and electrode base plate. The dotted lines in FIGS. 2A and 2B show how each base plate elements 11 and 16 can be made from two separate parts, a base plate 11A and 16A with the flat surface and a cooling fin sub-assembly 13, which can be joined to form the heat sink and electrode base plates 11 and 16. Hence there are multiple ways to do this that would be obvious to one skilled in the art. The use of alternate methods would not alter the spirit of the invention.

The flat elements allow the cell 10 to be clamped together with the spacer plate 14 around the periphery of the base electrode plates 11 and 16. This arrangements permits easy assembly and disassembly of the cell 10. Repair and replacement of parts is quick and simple. The flatness of the elements and lack of structural irregularities avoids distortions in the cell assembly and adverse performance. The materials selected for the ozone generation cell are low-cost and the design of the discharge chamber in the cell ensures that ozone generation performance is high. The ozone generation cell is compact, approximately 10"×7.5"×3" in one embodiment, and several cells can be easily stacked together so that ozone production is scalable.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. An electrical discharge ozone generation cell comprising:
    a nonconductive spacer plate separating first and second electrode base plates, the spacer plate having two sides and interior edges defining a central opening in the spacer plate;
    an electrode plate in intimate contact with the first electrode base plate, the electrode plate fitted within the central opening of the spacer plate;
    a dielectric plate in intimate contact with the second electrode base plate and with the spacer plate, a gas discharge chamber defined by the dielectric plate, the interior edges of the spacer plate and the electrode plate; and
    gaskets on the two sides of the spacer plate around the central opening displaced away from the interior edges of the spacer plate whereby the gaskets ensure a gas seal for the gas discharge chamber at a reduced exposure to ozone in the gas discharge chamber.

2. The electrical discharge ozone generation cell of claim 1 wherein the gaskets comprise O-ring gaskets.

3. The electrical discharge ozone generation cell of claim 2 further comprising:
grooves in both sides of the spacer plate around the central opening displaced away from the interior edges of the spacer plate to receive the O-ring gaskets.

4. The electrical discharge ozone generation cell of claim 1 wherein the gaskets comprises elastic material.

5. The electrical discharge ozone generation cell of claim 4 wherein the gaskets comprises FKM (fluoroelastomer) material.

6. The electrical discharge ozone generation cell of claim 1 wherein the spacer plate comprises polycarbonate.

7. The electrical discharge ozone generation cell of claim 1 wherein the electrode plate comprises anodized aluminum infused with PTFE (Polytetrafluoroethylene).

8. The electrical discharge ozone generation cell of claim 1 wherein the electrode plate comprises anodized aluminum.

9. The electrical discharge ozone generation cell of claim 1 wherein the electrode plate comprises high chrome steel.

10. The electrical discharge ozone generation cell of claim 1 wherein the electrode plate comprises anodized alumina bonded to a conductive carrier.

11. The electrical discharge ozone generation cell of claim 1 wherein the first and second electrode base plates comprise aluminum.

12. The electrical discharge ozone generation cell of claim 1 wherein the spacer plate has a first predetermined thickness, the electrode plate has a second predetermined thickness, the dielectric plate has a third predetermined thickness and a difference between the first predetermined thickness and a sum of the second and third predetermined thicknesses creates the gas discharge chamber with the interior edges of the spacer plate.

13. An electrical discharge ozone generation cell comprising:
a nonconductive spacer plate separating first and second electrode base plates, the spacer plate having two sides and interior edges defining a central opening in the spacer plate;
an electrode plate in intimate contact with the first electrode base plate, the electrode plate fitted within the central opening of the spacer plate;
a dielectric plate in intimate contact with the second electrode base plate and with the spacer plate, a gas discharge chamber defined by the dielectric plate, the interior edges of the spacer plate and the electrode plate; and
gaskets on the two sides of the spacer plate around the central opening to ensure a gas seal for the gas discharge chamber;
wherein the spacer plate has a first predetermined thickness, the electrode plate has a second predetermined thickness, the dielectric plate has a third predetermined thickness, and a difference between the first predetermined thickness and a sum of the second and third predetermined thicknesses creates the gas discharge chamber with the interior edges of the spacer plate.

14. The electrical discharge ozone generation cell of claim 13, wherein the difference between the first predetermined thickness and the sum of the second and third predetermined thicknesses is in a range of (10 to 30) x$10^{-3}$ inches.

15. The electrical discharge ozone generation cell of claim 13 wherein the spacer plate comprises polycarbonate.

16. The electrical discharge ozone generation cell of claim 13 wherein the electrode plate comprises anodized aluminum infused with PTFE (Polytetrafluoroethylene).

17. The electrical discharge ozone generation cell of claim 13 wherein the first and second electrode base plates comprise aluminum.

18. The electrical discharge ozone generation cell of claim 13 wherein the gaskets comprises elastic material.

19. The electrical discharge ozone generation cell of claim 18 wherein the gaskets comprises FKM (fluoroelastomer) material.

20. An electrical discharge ozone generation cell comprising
a nonconductive spacer plate separating first and second electrode base plates, the spacer plate having two sides and interior edges defining a central opening in the spacer plate;
an electrode plate in intimate contact with the first electrode base plate, the electrode plate fitted within the central opening of the spacer plate, wherein the electrode plate comprises anodized aluminum infused with PTFE (Polytetrafluoroethylene);
a dielectric plate in intimate contact with the second electrode base plate and with the spacer plate, a gas discharge chamber defined by the dielectric plate, the interior edges of the spacer plate and the electrode plate; and
gaskets on the two sides of the spacer plate around the central opening displaced away from the interior edges of the spacer plate whereby the gaskets ensure a gas seal for the gas discharge chamber at a reduced exposure to ozone in the gas discharge chamber.

21. The electrical discharge ozone generation cell of claim 20 wherein the spacer plate comprises polycarbonate.

22. The electrical discharge ozone generation cell of claim 20 wherein the first and second electrode base plates comprise aluminum.

23. The electrical discharge ozone generation cell of claim 20 wherein the gaskets comprises elastic material.

24. The electrical discharge ozone generation cell of claim 23 wherein the gaskets comprises FKM (fluoroelastomer) material.

25. An electrical discharge ozone generation cell comprising
a nonconductive flat spacer plate separating first and second electrode base plates, the spacer plate having two sides and interior edges defining a central opening in the spacer plate;
a flat electrode plate in intimate contact with the first electrode base plate, the electrode plate fitted within the central opening of the spacer plate;
a flat dielectric plate in intimate contact with the second electrode base plate and with the spacer plate, a gas discharge chamber defined by the dielectric plate, the interior edges of the spacer plate and the electrode plate;
gaskets on the two sides of the spacer plate around the central opening displaced away from the interior edges of the spacer plate whereby the gaskets ensure a gas seal for the gas discharge chamber at a reduced exposure to ozone in the gas discharge chamber; and
a clamping arrangement engaging peripheries of the first and second electrode base plates through the spacer plate; whereby the flat spacer plate, flat electrode plate, flat dielectric plate and gaskets are bound together between the first and second electrode base plates with minimal distortion.

26. The electrical discharge ozone generation cell of claim 25 wherein the clamping arrangement comprises a plurality of holes distributed around the peripheries of the first and second electrode base plates and the spacer plate, and a corresponding plurality of nonconductive fasteners, each fastener binding the first and second electrode base plates with the flat spacer plate between them through a corresponding hole.

27. The electrical discharge ozone generation cell of claim 26 wherein each fastener comprises a threaded rod and a reciprocally threaded nut.

28. The electrical discharge ozone generation cell of claim 27 wherein the threaded rod comprises a bolt.

29. The electrical discharge ozone generation cell of claim 26 wherein each fastener comprises plastic reinforced with fiberglass.

30. The electrical discharge ozone generation cell of claim 25 wherein each of the plurality of holes distributed around the peripheries of the first and second electrode base plates is chamfered.

31. The electrical discharge ozone generation cell of claim 30 wherein the first and second electrode base plates each have a flat surface facing the spacer plate, each of the plurality of holes distributed around the peripheries of the first and second electrode base plates chamfered in the flat surface.

32. The electrical discharge ozone generation cell of claim 25 wherein the spacer plate laterally extends beyond the first and second electrode base plates.

33. The electrical discharge ozone generation cell of claim 25 wherein the flat spacer plate includes a recess in one side around the periphery of the central opening to hold the dielectric plate.

34. The electrical discharge ozone generation cell of claim 33 wherein the recess includes one of the gaskets around the central opening displaced away from the interior edges of the spacer plate.

35. An electrical discharge ozone generation cell comprising
  a nonconductive spacer plate separating first and second electrode base plates, the spacer plate having two sides and interior edges defining a central opening in the spacer plate;
  an electrode plate in intimate contact with a surface of the first electrode base plate, the electrode plate fitted within the central opening of the spacer plate;
  a dielectric plate in intimate contact with the second electrode base plate and with the spacer plate, a gas discharge chamber defined by the dielectric plate, the interior edges of the spacer plate and the electrode plate, the gas discharge chamber having two opposing ends at which a displacement of the interior edges of the central opening from the electrode plate at the two opposing ends; and
  channels along the surface of the first electrode base plate at each of the two opposing ends of the gas discharge chamber, the channels connected through the first electrode base plate to gas input and output terminals, the channels exposed to the gas discharge chamber by a displacement of the interior edges of the central opening from the electrode plate at the two opposing ends;
  whereby the channels form manifolds for the input and output of gas to and from the gas discharge chamber.

36. The electrical discharge ozone generation cell of claim 35 wherein the spacer plate has a first predetermined thickness, the electrode plate has a second predetermined thickness, the dielectric plate has a third predetermined thickness, and a difference between the first predetermined thickness and a sum of the second and third predetermined thicknesses creates the gas discharge chamber with the interior edges of the spacer plate.

37. The electrical discharge ozone generation cell of claim 35, further comprising: gaskets on the two sides of the spacer plate around the central opening displaced away from the interior edges of the spacer plate whereby the gaskets ensure a gas seal for the gas discharge chamber at a reduced exposure to ozone in the gas discharge chamber.

38. The electrical discharge ozone generation cell of claim 37 wherein the gaskets comprises elastic material.

39. The electrical discharge ozone generation cell of claim 38 wherein the gaskets comprises FKM (fluoroelastomer) material.

40. The electrical discharge ozone generation cell of claim 35 wherein the spacer plate comprises polycarbonate.

41. The electrical discharge ozone generation cell of claim 35 wherein the electrode plate comprises anodized aluminum infused with PTFE (Polytetrafluoroethylene).

42. The electrical discharge ozone generation cell of claim 35 wherein the first and second electrode base plates comprise aluminum.

\* \* \* \* \*